United States Patent
Hsu et al.

(10) Patent No.: US 8,975,871 B2
(45) Date of Patent: Mar. 10, 2015

(54) POWER MANAGEMENT METHOD AND ELECTRONIC SYSTEM USING THE SAME

(75) Inventors: Chih-Wan Hsu, Taipei (TW); Nung-Te Huang, Taipei (TW); Yi-Wen Chiu, Taipei (TW); Hsi-Ho Hsu, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 409 days.

(21) Appl. No.: 13/477,067

(22) Filed: May 22, 2012

(65) Prior Publication Data

US 2012/0299530 A1    Nov. 29, 2012

Related U.S. Application Data

(60) Provisional application No. 61/490,086, filed on May 26, 2011.

(51) Int. Cl.
| | |
|---|---|
| H02J 7/00 | (2006.01) |
| H02J 1/14 | (2006.01) |
| H02J 7/34 | (2006.01) |
| H02J 9/06 | (2006.01) |

(52) U.S. Cl.
CPC ... H02J 1/14 (2013.01); H02J 7/34 (2013.01); H02J 9/06 (2013.01)
USPC ............ 320/125; 320/103; 320/137; 320/140; 320/160

(58) Field of Classification Search
CPC ...... H02J 7/0068; G06F 1/3203; G06F 1/263; G06F 1/3212; G06F 1/3265
USPC .......................... 320/103, 125, 137, 140, 160
See application file for complete search history.

(56) References Cited

U.S. PATENT DOCUMENTS

| | | | |
|---|---|---|---|
| 5,867,007 A | 2/1999 | Kim | |
| 2006/0267973 A1 | 11/2006 | Woo et al. | |
| 2008/0174278 A1* | 7/2008 | Masias et al. | 320/138 |
| 2009/0021216 A1 | 1/2009 | Hills et al. | |
| 2011/0006735 A1* | 1/2011 | Wu et al. | 320/125 |

FOREIGN PATENT DOCUMENTS

| | | |
|---|---|---|
| CN | 101656424 | 2/2010 |
| CN | 101957647 | 1/2011 |
| CN | 102055039 | 5/2011 |
| TW | 200530785 | 9/2005 |

* cited by examiner

*Primary Examiner* — Paul Dinh
(74) *Attorney, Agent, or Firm* — Jianq Chyun IP Office

(57) ABSTRACT

A power management method and an electronic system using the same are provided. The electronic system includes a display device and an auxiliary device, and has dual batteries and two subsystems. By detection and control mechanisms of the subsystems, the electronic system may allow the display device to maintain in a full power state, in the case where the external power is available or the power of the auxiliary device is sufficient. On the other hand, the auxiliary device may apply to the display device, such as a notebook computer, and the battery time may also be extended since the computer has two batteries.

7 Claims, 5 Drawing Sheets

POWER MANAGEMENT METHOD AND ELECTRONIC SYSTEM USING THE SAME

CROSS-REFERENCE TO RELATED APPLICATION

This application claims the priority benefits of U.S. provisional application Ser. No. 61/490,086, filed on May 26, 2011. The entirety of the above-mentioned patent applications is hereby incorporated by reference herein and made a part of this specification.

BACKGROUND OF THE INVENTION

1. Field of the Invention

The present invention relates to a power management technology, more particularly, to a power management method and an electronic system using the same.

2. Description of Related Art

Nowadays, ordinary portable electronic device (e.g. tablet device or notebook computer) is only disposed with one single battery internally. Usually, portable electronic device is provided with two power supply modes: powered by the external power or powered by the battery. In battery mode, the usage time of portable electronic device is determined by power consumption and battery capacity thereof. In order to increase the usage time of portable electronic device, the design approach is tended to reduce the power consumption of the system and increase the capacity of the battery. However, the battery capacity is limited by overall system space. Accordingly, from the viewpoint of increasing the battery time of the electronic device, the effect of increasing the battery capacity is in fact limited.

SUMMARY OF THE INVENTION

The disclosure provides an electronic system with power management, and the provided electronic system includes a display device and an auxiliary device. The display device includes a first battery. The auxiliary device includes a second battery. When the display device is connected with the auxiliary device, if an external power is detected for supplying power, power is supplied from the external power to the first battery and the second battery, if there is no external power detected (or there is no connection of external power), power is supplied from the second battery to the first battery.

The disclosure further provides a power management method for controlling the charging/discharging between a first battery of a display device and a second battery of an auxiliary device. The provided power management method includes: supplying power from an external power to the first battery and the second battery for charging if the external power is detected and when the display device is connected with the auxiliary device; and supplying power from the second battery to the first battery for charging if the external power is not detected and the power of the second battery is sufficient.

In view of above, the electronic system of the disclosure includes a display device and an auxiliary device, and has dual batteries and two subsystems. In the case where an external power is available, power is supplied from the external power to the two batteries for charging, thereby supplying power to the electronic system (the display device and the auxiliary device); in the case where an external power is not available, power is supplied from the battery of the auxiliary device to the battery of the display device for charging, thereby supplying power to the electronic system; in the case where the external power is not available and the battery capacity of the auxiliary device is insufficient, power is supplied from the battery of the display device to the computer (i.e. the electronic system). Accordingly, the electronic system allows the display device to maintain in a full power state when the external power is available, or the power of the auxiliary device is sufficient. On the other hand, the auxiliary device of the disclosure may apply to the display device of a notebook computer form, and the battery time may also be extended since the computer has two batteries.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Reference will now be made in detail to the exemplary embodiments of the invention, examples of which are illustrated in the accompanying drawings. In addition, whenever possible, identical or similar reference numbers stand for identical or similar elements in the figures and the embodiments.

Figure 1:
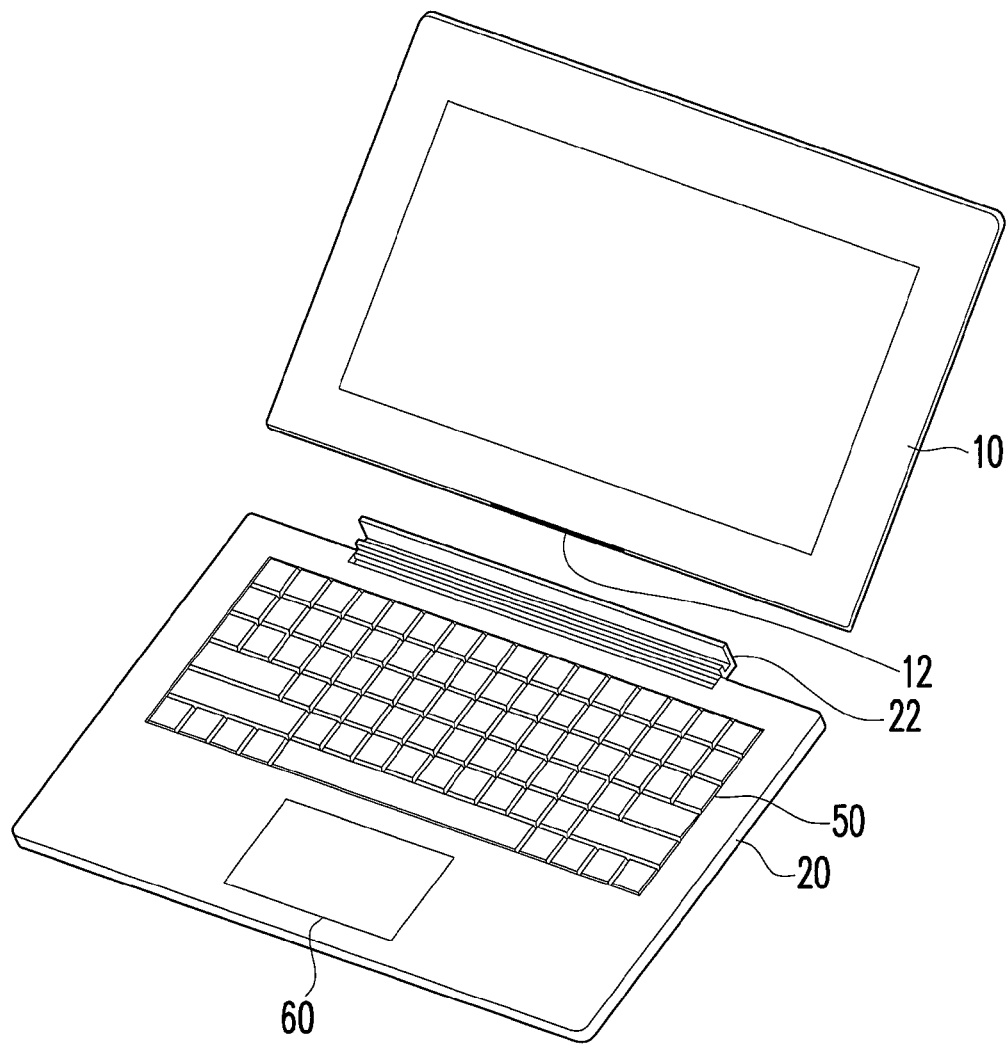
FIG. 1 is a separate schematic view of a display device and an auxiliary device according to an embodiment.
Figure 2:
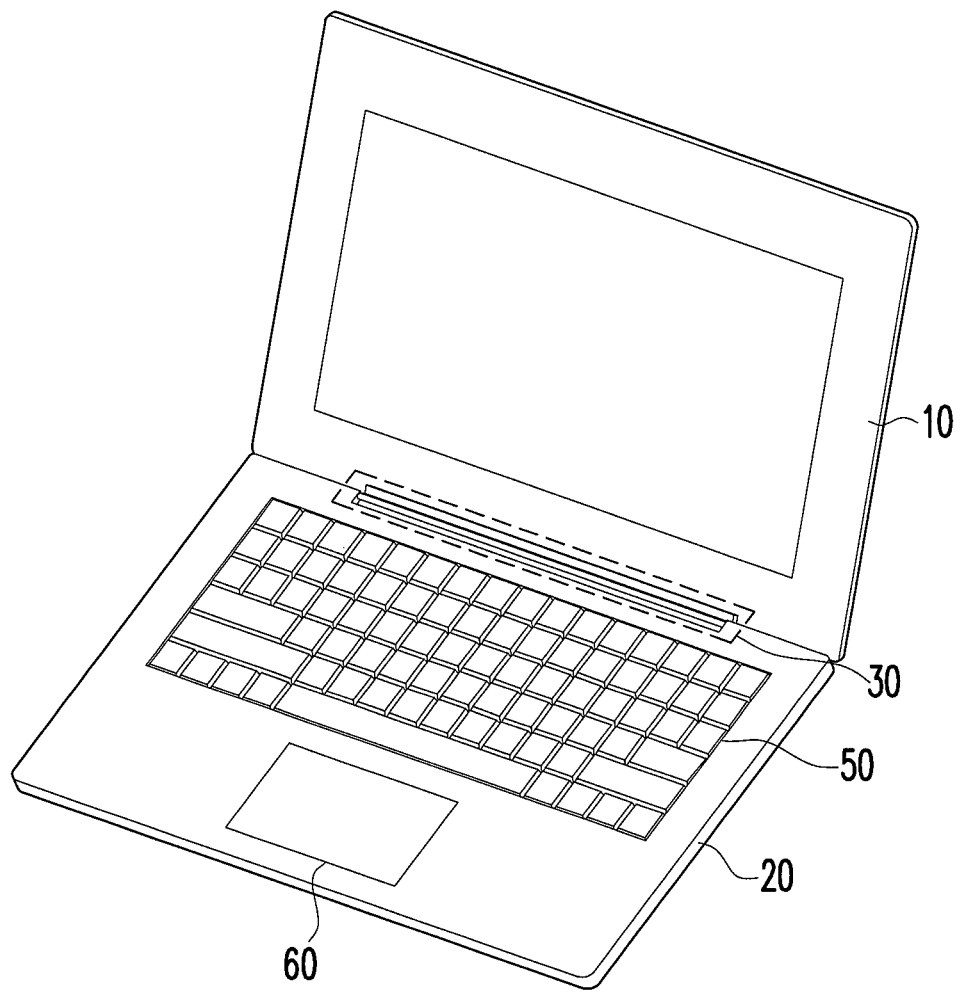
FIG. 2, FIG. 3 and FIG. 4 are schematic views of an electronic system having power management according to an embodiment.
Figure 3:
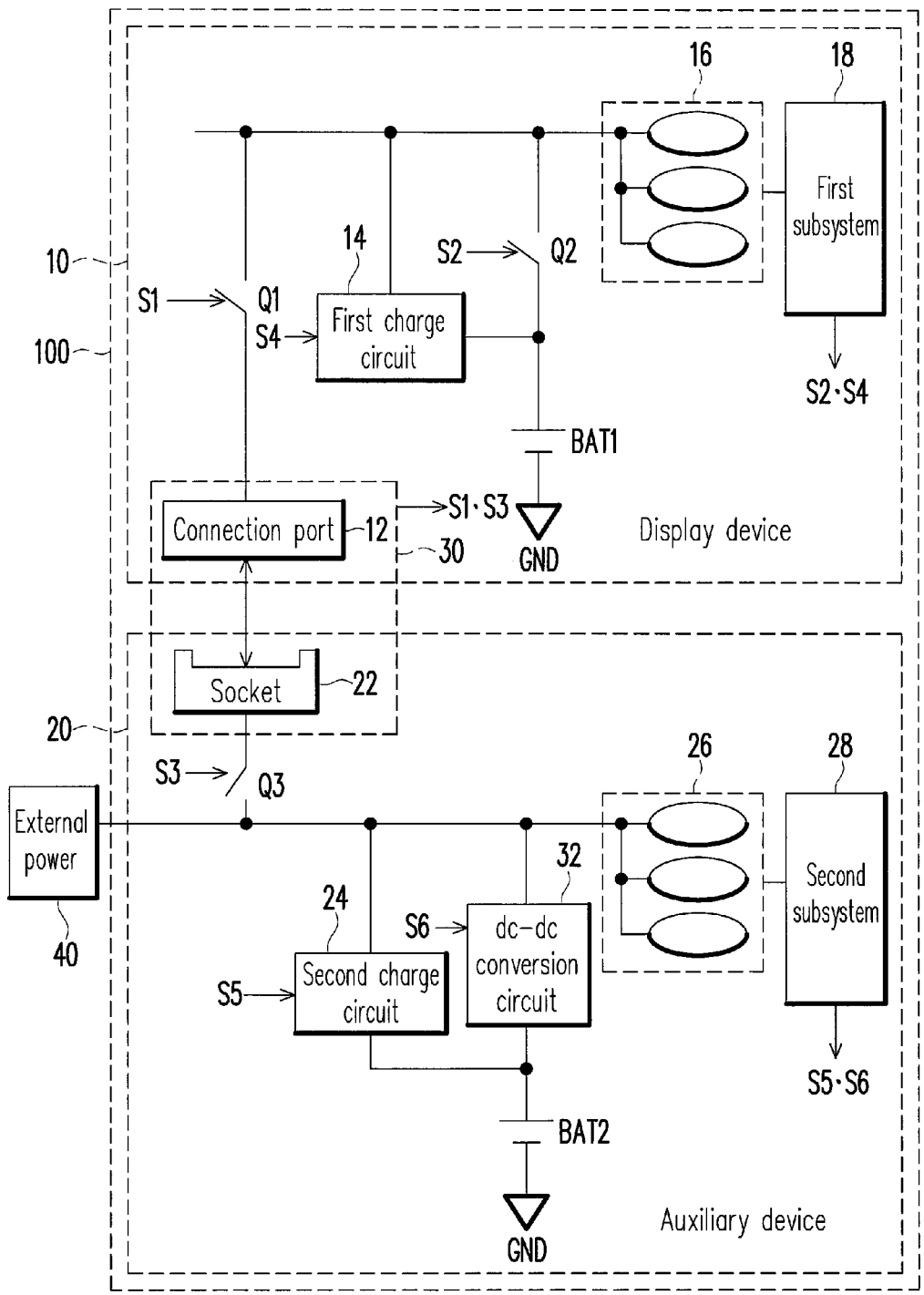
Figure 4:
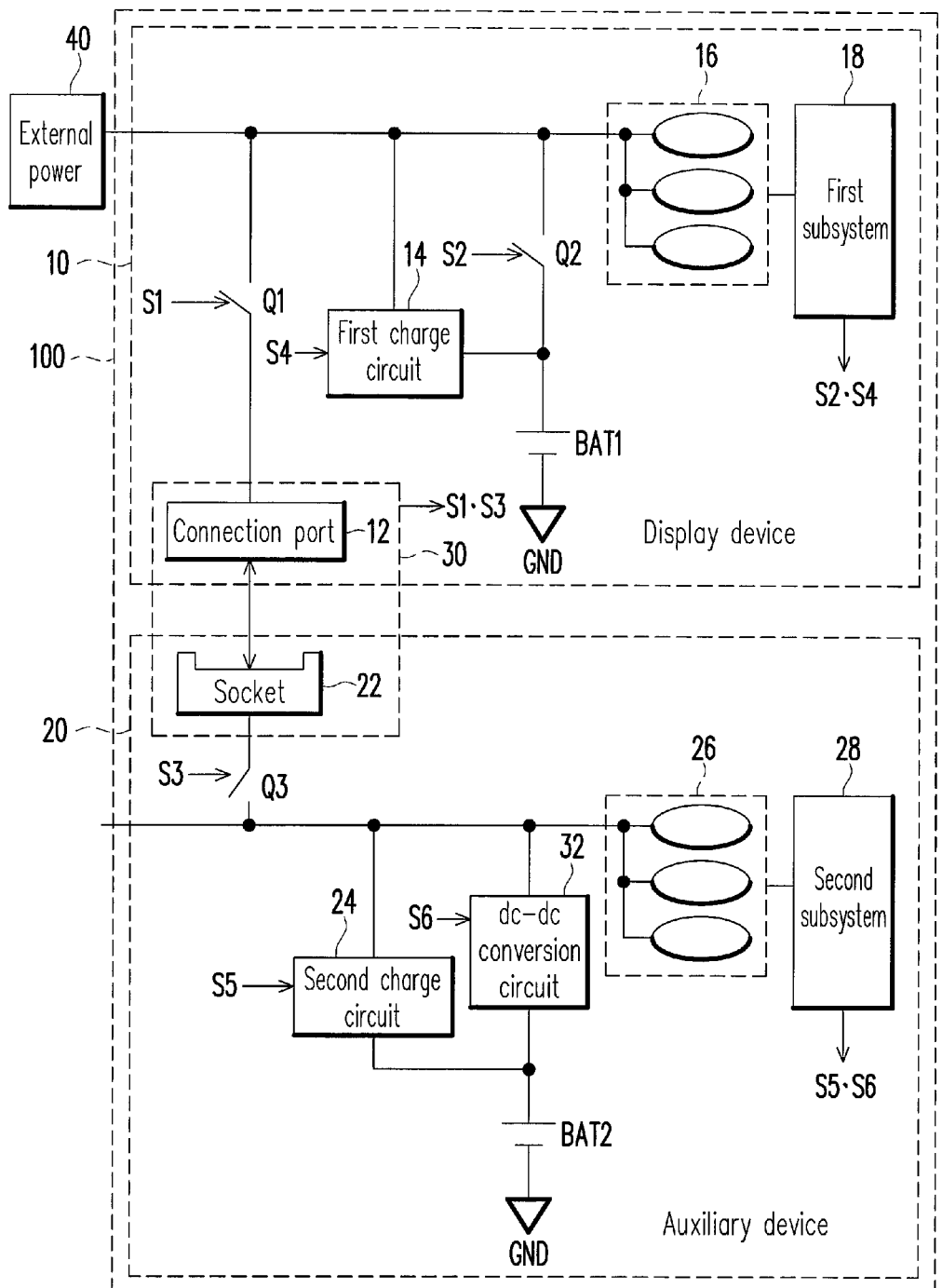

FIG. 1 is a separate schematic view of a display device 10 and an auxiliary device 20 according to an embodiment of the disclosure. FIG. 2, FIG. 3 and FIG. 4 are schematic views of an electronic system 100 having power management according to an embodiment. Please refer to FIG. 1 to FIG. 4. The electronic system 100 includes the display device 10 and the auxiliary device 20. The display device 10 may be a touch control device having a touch screen, such as tablet computer or personal digital assistant (PDA) or a portable device with touch screen, but is not limited thereto. The display device 10 may include a connection port 12, a first battery BAT1, a first charge circuit 14, at least one of first power rails 16 and a first subsystem 18. The first battery BAT1 is coupled to the connection port 12 and the grounding GND. The first charge circuit 14 is coupled to the connection port 12 and the first battery BAT1, and configured for charging the first battery BAT1. The first subsystem 18 is configured for controlling the operation and each corresponding function (for example, touch control, charging/discharging and the likes, but is not limited thereto) of the display device 10. The first power rails 16 are coupled between the connection port 12 and the first subsystem 18, and configured for generating the driving power of the display device 10.

The auxiliary device 20 may be an input device, for example, a keyboard docking having at least a keyboard (e.g. a keyboard 50 as illustrated in FIG. 1 and FIG. 2, the keyboard 50 may be a QWERTY Keyboard) and an input pad 60. The auxiliary device 20 is adapted for the display device 10 which has a detachable feature. The auxiliary device 20 may include a socket 22 for docking the display device 10, a second charge circuit 24, a dc-dc conversion circuit 32, a second battery BAT2, at least one of second power rails 26 and a second subsystem 28. The dc-dc conversion circuit 32 may be a boost type dc-dc conversion circuit, but is not limited thereto. The second battery BAT2 is coupled between the dc-dc conversion circuit 32 and the grounding GND. The second charge circuit 24 is coupled between the socket 22 and the second battery BAT2, and configured for charging the second battery BAT2. The second subsystem 28 is configured for controlling the operation and each corresponding function (for example, keyboard operation, charging/discharging, but is not limited thereto) of the auxiliary device 20. The second power rails 26 are coupled to the socket 22, and configured for generating the driving power of the auxiliary device 20.

When the display device 10 is docked on the auxiliary device 20 (as illustrated in FIG. 2), the combination of the two devices allows the electronic system 100 to become a notebook computer. The display device 10 may be used as a two-in-one device, for users to use its original touch control function or the keyboard operation of the notebook computer. Further, a system interface 30 is formed by connecting the connection port 12 with the socket 22, such that the first subsystem 18 and the second subsystem 28 can be communicated. When the display device 10 is connected with the auxiliary device, the first subsystem 18 or the second subsystem 28 of the electronic system 100 may detect that the power is supplied from the external power 40 (for example, the FIG. 3 illustrates that the external power 40 is connected to the auxiliary device 20, and FIG. 4 illustrates that the external power 40 is connected to the display device 10), thereby the power is supplied from the external power 40 to the first battery BAT1 and the second battery BAT2. When there is no connection made to the external power 40, the power is supplied from the second battery BAT2 to the first battery BAT1.

In the electronic system 100 of FIG. 3 or FIG. 4, whether the external power 40 is available may be determined through detection and control mechanisms (for example, the external power 40 is a power adapter) of the first subsystem 18 or the second subsystem 28. When the external power 40 is available, the second subsystem 28 transmits the control signal S5 to enable the second charge circuit 24. The second subsystem 28 may provide a detection message to notify the first subsystem 18, such that the first subsystem 18 transmits the control signal S4 to enable the first charge circuit 14 in response to the detection of the second subsystem 28. In addition, the first subsystem 18 may independently detect whether the external power 40 is available, and then determine whether to transmit the control signal S4 to enable the first charge circuit 14. In this case, the power is supplied from the external power 40 to the first power rails 16 and the second power rails 26, and thereby supplying the power to the first subsystem 18 and the second subsystem 28. Moreover, the external power 40 may supply the power to the first charge circuit 14 and the second charge circuit 24, thereby charging the first battery BAT1 and the second battery BAT2 respectively.

In the case where the external power 40 is not available, the second subsystem 28 may detect the power of the second battery BAT2. If the power of the second battery BAT2 is sufficient, the second subsystem 28 transmits the control signal S6 to enable the dc-dc conversion circuit 32. The second subsystem 28 provides a detection message to notify the first subsystem 18, such that the first subsystem 18 transmits the control signal S4 to enable the first charge circuit 14 in response to the detection of the second subsystem 28. In addition, the first subsystem 18 may detect the power of the second battery BAT2 through the system interface 30, thereby controlling the operation of the first charge circuit 14. Therefore, voltage of the second battery BAT2 may be boosted through the operation of the dc-dc conversion circuit 32, so as to supply the power to the first power rails 16 and the second power rails 26, and supply the power to the first charge circuit 14, so that the first battery BAT1 may be charged by the first charge circuit 14.

In the case where the external power 40 is not available, if the power of the second battery BAT2 detected by the subsystem 28 is insufficient, the second subsystem 28 transmits the control signal S6 to turn off (disable) the dc-dc conversion circuit 32. When the second subsystem 28 transmits a detection message to notify the first subsystem 18, the first subsystem 18 transmits, in response to the detection of the second subsystem 28, the control signal S4 to turn off the first charge circuit 14 for stopping charging, accordingly, the first battery BAT1 is discharged and thus the power is supplied from the first battery BAT1 through the first power rails 16 and the second power rails 26 to the first subsystem 18 and the second subsystem 28. Of course, the first subsystem 18 may also detect the power of the second battery BAT2 through the system interface 30, thereby turn off the operation of the first charge circuit 14.

In particular, the charging/discharging mechanism of the electronic system 100 further includes controlling a plurality of switches. The display device 10 further includes a first switch Q1 and a second switch Q2. The first switch Q1 is coupled between the connection port 12, the first power rails 16, the first charge circuit 14 and the first subsystem 18. The second switch Q2 is coupled between the first switch Q1, the first power rails 16, the first charge circuit 14 and the first battery BAT1. The auxiliary device 20 further includes a third switch Q3. The third switch Q3 is coupled between the socket 22, the second charge circuit 24, the dc-dc conversion circuit 32, the second power rails 26 and the first subsystem 28.

In view of above, in the case where the connection port 12 is not connected to the socket 22 (i.e. before the system interface 30 is formed), the statuses of each of switches are as follows: the first switch Q1 and the third switch Q3 are at off status, and the second switch Q2 is at on status. In the case where the system interface 30 is formed, linking-up signals S1 and S3 are generated from the system interface 30 due to the connection of the connection port 12 and the socket 22, thereby the first switch Q1 and the third switch Q3 are enabled respectively, and thus the first switch Q1 and the third switch Q3 are turned on. In the case where the external power 40 is detected by the subsystem 28, the detection message is supplied from the first subsystem 28 to the first subsystem 18. In addition, the external power 40 may also be detected by the first subsystem 18; in this case, the detection message is supplied from the first subsystem 18 to the second subsystem 28. The first subsystem 18 transmits the control signal S4 to enable the first charge circuit 14 and transmits the control signal S2 to turn off the second switch Q2. Accordingly, the external power 40 supplies the power to both batteries (BAT1, BAT2) for charging, and supplies the power to the display device 10 and auxiliary device 20 for using.

In the case where the external power 40 is not detected by the first subsystem 18 or the second subsystem 28, and the power of the second battery BAT2 is sufficient, the first subsystem 18 transmits the control signal S2 to turn off the second switch Q2, thereby the power is supplied from the battery of the auxiliary device 20 to the battery of the display device 10 for charging. In the case where the external power 40 is not detected by first subsystem 18 or the second subsystem 28, and the power of the second battery BAT2 is insufficient, the first subsystem 18 transmits the control signal S2 to turn on the second switch Q2, thereby the power is supplied from the battery of the display device 10 to the display device 10 and the auxiliary device 20 for using.

In addition, the display device 10 and the auxiliary device 20 may combine to form a notebook computer, and allows the notebook computer formed to have dual batteries (BAT1 and BAT2) and two subsystems (18 and 28). By using the detection and control mechanisms of the subsystems, in the case where the external power 40 is available, the power is supplied from the external power 40 to the two batteries for charging, thereby supplying the power to the computer (the display device 10 and the auxiliary device 20) for using; in the case where the external power 40 is not available, the power is supplied from the battery of the auxiliary device 20 to the display device 10 for charging, thereby supplying the power to the computer for using; in the case where the external power 40 is not available and the power of the auxiliary device 20 is insufficient, the power is supplied from the battery of the display device 10 to the computer for using. Accordingly, the electronic system 100 may allow the display device 10 to maintain in a full power state, in the case where the external power 40 is available or the power of the auxiliary device 20 is sufficient. On the other hand, the auxiliary device 20 may extend the application of the display device 10 to a notebook computer form, and the battery time may also be extended since the computer has two batteries.

Figure 5:
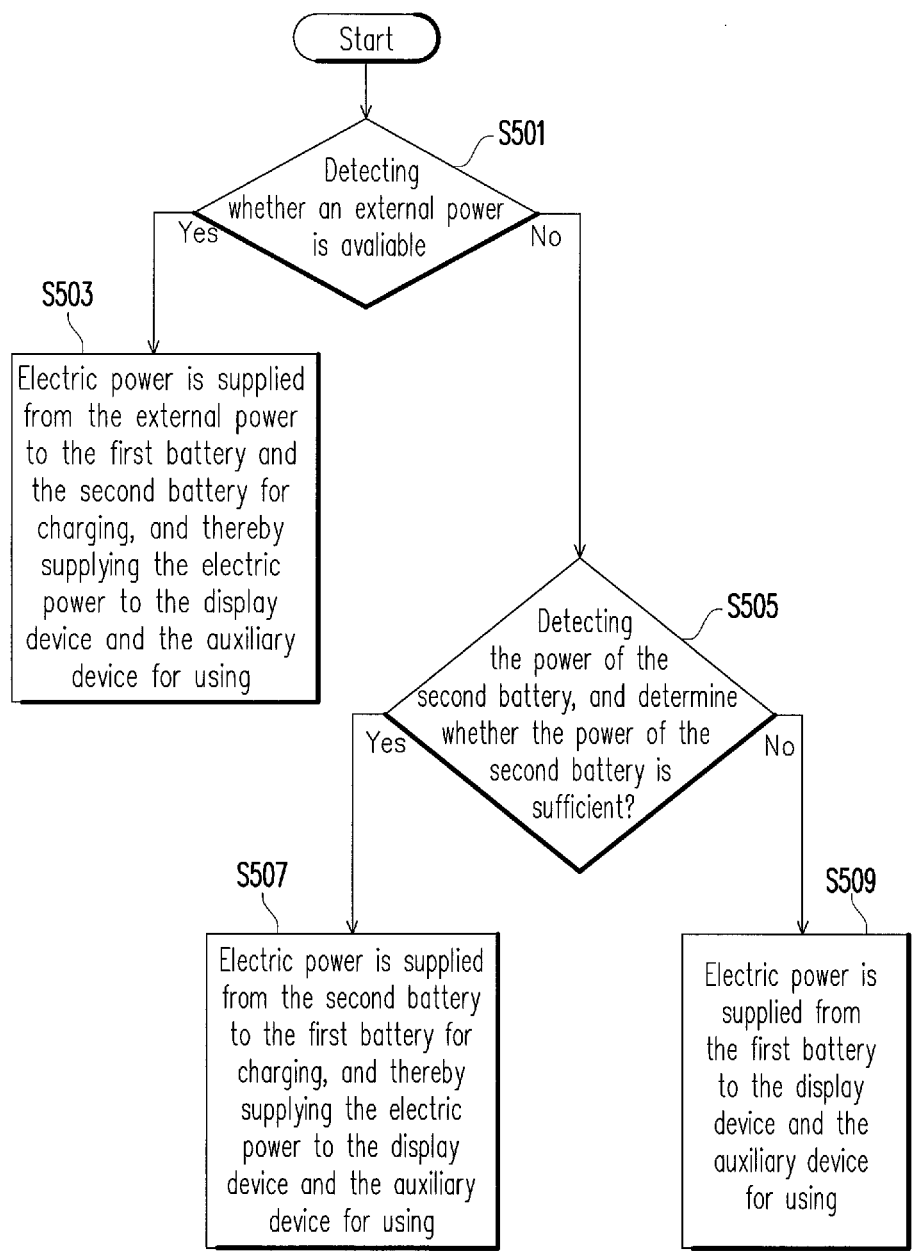
FIG. 5 is a flow chart illustrating a power management method according to an embodiment.

Based on the disclosure and teaching of the above embodiments, a general method for power management is provided, which is configured for controlling the charging/discharging between the first battery BAT1 of the display device 10 and the second battery BAT2 of the auxiliary device 20. Specifically, FIG. 5 is a flow chart illustrating a power management method according to an embodiment of the disclosure. Referring to FIG. 5, the power management method of the present embodiment includes following steps:

Detecting whether the external power is available (Step S501), in the case where the external power is available, the power is supplied from the external power to the first battery and the second battery for charging, thereby supplying the power to the display device and the auxiliary device for using (Step S503);

When the external power is not available, detecting the power of the second battery (Step S505), and then supplying the power from the second battery to the first battery for charging if the power of the second battery is sufficient, and further supplying the power to the display device and the auxiliary device for using (Step S507); and In the case where the external power is not available and the power of the battery is insufficient, the power is supplied from the first battery to the display device and the auxiliary device for using (Step S509).

In view of above, the electronic system of the embodiment of the disclosure includes a display device and an auxiliary device, and has dual batteries and two subsystems. By detection and control mechanisms of the subsystems, the electronic system may allow the display device to maintain in a full power state, in the case where the external power is available or the power of the auxiliary device is sufficient. On the other hand, the auxiliary device may extend the application of the display device to a notebook computer form, and the battery time may also be extended since the computer has two batteries.

Although the disclosure has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. An electronic system with power management, comprising:
   a display device comprising:
   a first battery;
   a connection port;
   a first subsystem;
   a first switch connected to the connection port and the first subsystem;
   a first charge circuit connected to the first switch and the first battery; and
   a second switch connected to the first switch and the first battery;
   and
   an auxiliary device comprising a second battery;
   a socket;
   a second subsystem;
   a third switch connected to the socket and the second subsystem;
   a second charge circuit connected to the third switch and the second battery; and
   a dc-dc conversion circuit, connected to the third switch and the second battery,
   wherein when the display device is connected with the auxiliary device by connecting the connection port to the socket, if an external power is detected, power is supplied from the external power to the first battery and the second battery, and if the external power is not detected, power is supplied from the second battery to the first battery.

2. The electronic system having power management according to claim 1, wherein power is supplied from the first battery to the display device and the auxiliary device when power of the second battery is insufficient.

3. The electronic system having power management according to claim 1, wherein the external power is connected to the auxiliary device.

4. The electronic system having power management according to claim 1, wherein the external power is connected to the display device.

5. The electronic system having power management according to claim 1, wherein the display device is a touch screen.

6. The electronic system having power management according to claim 1, wherein the auxiliary device is an input device.

7. The electronic system having power management according to claim 6, wherein the input device is a keyboard docking constructed by a keyboard and an input pad.

* * * * *